Patented Nov. 4, 1952

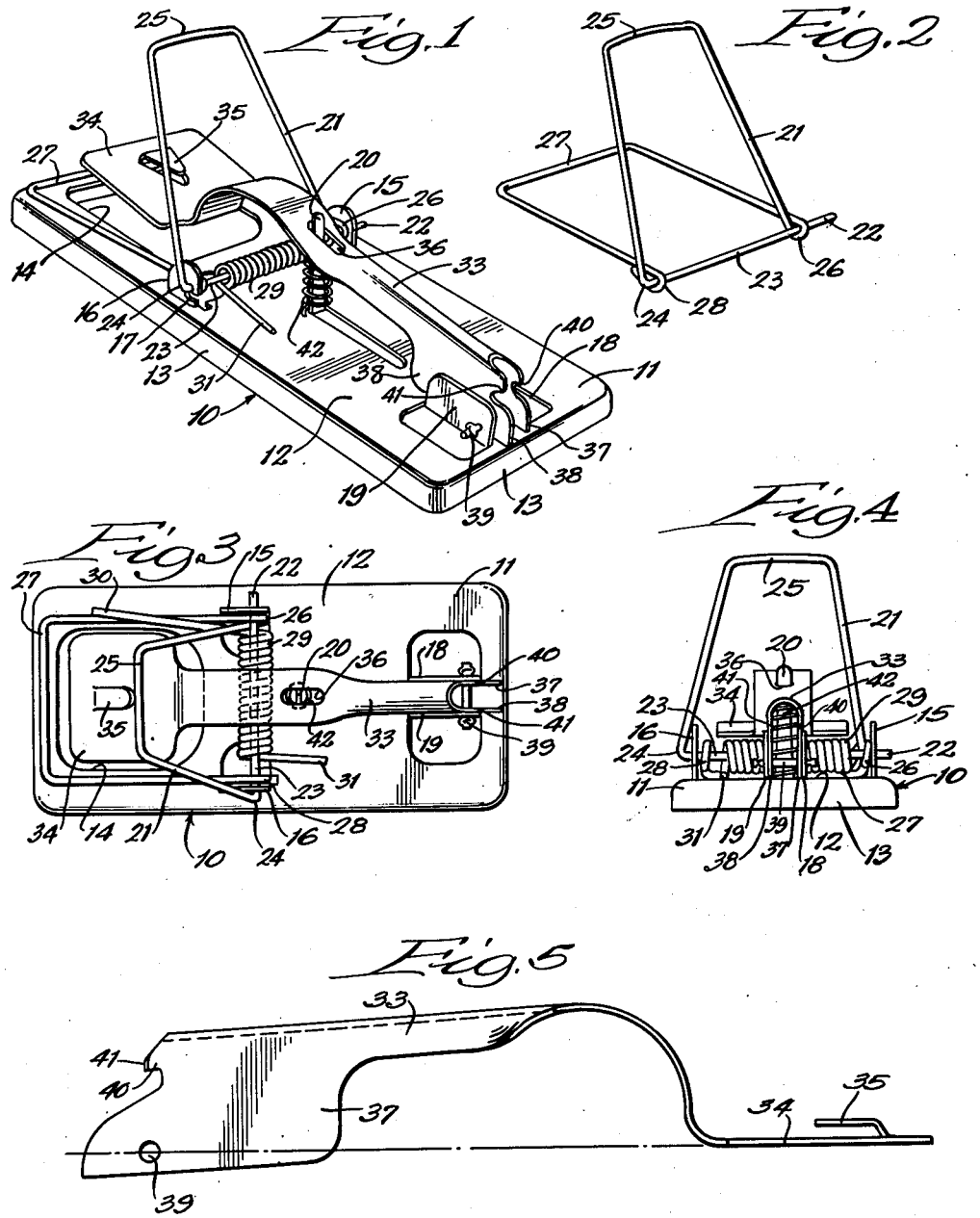

2,616,211

UNITED STATES PATENT OFFICE 2,616,211

MOUSETRAP

Virgil F. Johnson, Marion, Iowa, assignor to Triple E Manufacturing Company

Application May 22, 1947, Serial No. 749,743

5 Claims. (Cl. 43—81)

This invention relates to mouse traps.

The principal object of this invention is to provide an improved mouse trap which is accurate and sensitive in operation and which may be inexpensively manufactured and assembled.

In carrying out this object of the invention, the mouse trap preferably includes a sheet metal base having an opening adjacent one end thereof, having a pair of spaced jaw supporting ears struck upwardly from the base adjacent the center thereof, having a guide ear struck upwardly from the base adjacent the center thereof, and having a pair of spaced trigger supporting ears struck upwardly from the base adjacent the other end thereof. The mouse trap also preferably includes a jaw formed from a single piece of wire and having an axle portion pivotally mounted in the spaced jaw supporting ears and angularly disposed clamping and trigger engaging portions. The clamping portion of the jaw extends beyond the opening in the base and the trigger engaging portion extends beyond the spaced trigger supporting ears. A coil spring is carried by the axle portion of the jaw and has one end engaging the jaw and the other end engaging the base for moving the jaw to clamping position. The mouse trap also preferably includes a sheet metal trigger having an enlarged bait supporting portion overlying the opening in the base, having an opening for receiving the guide ear, and having spaced portions adjacent the spaced trigger supporting ears. A pivot pin extends through the spaced trigger supporting ears and the spaced portions of the trigger for pivotally mounting the trigger on the base. A trigger shoulder is provided on at least one of the spaced portions of the trigger for retaining the trigger engaging portion of the jaw until such time as the trap is sprung. A spring is preferably mounted on the guide ear between the trigger and the base for normally holding the trigger elevated and the trap in cocked position.

Further objects of this invention reside in the details of construction of the mouse trap and in the cooperative relation between the component parts thereof.

Other objects and advantages of this invention will become apparent to those skilled in the art upon reference to the accompanying specification, claims, and drawing in which—

Figure 1 is a perspective view of the mouse trap of this invention;

Figure 2 is a perspective view of the one-piece jaw;

Figure 3 is a plan view of the mouse trap;

Figure 4 is an end elevational view thereof; and

Figure 5 is an enlarged side elevational view of the trigger.

The mouse trap of this invention is generally designated at 10 and it includes a sheet metal base 11 having a top surface 12 and side flanges 13. Because of the flange construction, the sheet metal base may be made of relatively thin material and still retain a great deal of rigidity and strength. The base 11 is provided adjacent one end with an opening 14. A pair of spaced jaw supporting ears 15 and 16 are struck upwardly from the base adjacent the center thereof. The ear 15 is provided with a hole and the ear 16 is provided with a slot 17. A pair of spaced trigger supporting ears 18 and 19 are struck upwardly from the base 11 and the ears are provided with aligned holes. Also, adjacent the center of the base 11, a guide ear 20 is struck upwardly therefrom.

The jaw 21 of the mouse trap is made from a single piece of wire. At one end 22 of the wire, the jaw includes an axle portion 23. The wire is then bent at 24 to form a trigger portion 25 and is bent and looped over the axle portion 23 at 26 to form a clamping portion 27. The other end of the wire is bent at 28 over the axle portion 23 to form the completed jaw. In the assembly of the jaw 21, a coil spring 29 having ends 30 and 31 is mounted on the axle portion 23 of the jaw. In mounting the jaw 21 on the base 11, the end 22 of the wire forming the jaw is inserted through the hole in the jaw supporting ear 15 and the axle portion 23 adjacent the bend 24 is inserted in the slot 17 in the ear 16. Thus the jaw 21 is pivotally mounted on the base 11. The end 30 of the coil spring engages over the clamping portion 27 of the jaw 21 and the end 31 of the coil spring engages the base 11 whereby the jaw is spring biased to clamping position.

The trigger 33 is also preferably made of sheet metal and it includes an enlarged bait receiving portion 34 which overlies the opening 14 in the base. The bait receiving portion 34 has a hook 35 struck therefrom for the purpose of attaching the bait to the trigger. The trigger 33 is also provided with a hole 36 for receiving the guide ear 20. The trigger 33 is also provided with a pair of spaced portions 37 and 38 adjacent the spaced trigger supporting ears 18 and 19 and these spaced portions 37 and 38 are also provided with aligned holes. A pin 39 extends through the aligned holes in the spaced trigger supporting ears 18 and 19 and the spaced portions 37 and 38. Thus, the trigger 33 is pivotally mounted on the base 11. Because of the spaced portions 37 and 38 and the spaced ears 18 and 19, lateral rocking of the trigger 33 is entirely prevented whereby sensitivity of the trigger 33 is maintained at an optimum.

The spaced portions 37 and 38 are provided with trigger shoulders 40 and 41 respectively for the purpose of retaining the trigger engaging portion 25 of the jaw 21 until the trap is sprung. As is illustrated in Figs. 3 and 5, the trigger shoulder 41 is larger than the trigger shoulder 40 so that as the trap is being sprung both shoulders 40 and 41 at first retain the trigger portion 25 of the jaw 21, then only the shoulder portion 41 retains the trigger portion 25 until final release of the jaw 21 by the trigger 33. By having the trigger shoulder 41 solely control the final release of the jaw 21, the sensitivity of the mouse trap is greatly increased. While the shoulder 40 cooperating with the shoulder 41 also operates to retain the jaw 21 while the trap is cocked, the shoulder 40 may be eliminated, if desired.

The guide ear 20 extending through the hole 36 in the trigger 33 assists in guiding the trigger. A spring 42 is preferably carried by the guide ear 20 and interposed between the trigger 33 and the base 11 for holding the trigger 33 elevated. The spring 42 operates to overcome the weight of the trigger 33 and to assist in setting the trap.

In setting the trap, all that is necessary to do is to first bait the trap and then grasp the trigger portion 25 of the jaw 21 and move it against the action of the spring 29 over the shoulders 40 and 41. As the trigger engaging portion 25 of the jaw 21 is being moved over the shoulders 40 and 41, the opening 14 in the base 11 permits the bait supporting portion 34 of the trigger 33 to recede. When the portion 25 of the jaw has passed the shoulders 40 and 41 of the trigger 33, the spring 42 then raises the trigger 33 forcing the shoulders 40 and 41 outwardly to retain the jaw. Therefore, in setting the trap, manual manipulation of the trigger with consequent danger of being snapped is eliminated.

After the trap is so set, any distinct pressure on the bait supporting portion 34 of the trigger 33 will move the shoulders 40 and 41 inwardly to release the jaw 21 whereby the spring 29 will move the jaw to clamping position adjacent the bait supporting portion 34 of the trigger 33. By having the single shoulder 41 controlling the ultimate release of the jaw 21, the sensitivity of the mouse trap is greatly enhanced.

While for purposes of illustration one form of this invention has been disclosed, other forms thereof may become apparent to those skilled in the art upon reference to this disclosure, and, therefore, this invention is to be limited only by the scope of the appended claims and prior art.

I claim as my invention:

1. A mouse trap comprising a base, a pair of spaced jaw supporting ears on the base having openings therein, a jaw formed from a single piece of wire and including a straight axle portion formed from one end of the wire and having a first free end and a second end, a substantially U-shaped trigger engaging portion extending radially from the straight axle portion and formed from the wire by bending the same from the second end of the straight axle portion and looping the same over the straight axle portion adjacent its first free end and a substantially U-shaped clamping portion extending radially from the straight axle portion and angularly displaced with respect to the trigger engaging portion and formed from the wire at the loop adjacent the first free end of the straight axle portion and looping the same over the straight axle portion adjacent its second end, the ends of the straight axle portion of the jaw being received in the openings in the spaced jaw supporting ears for pivotally mounting the jaw on the base, a coil spring carried by the straight axle portion of the jaw and having one end engaging the jaw and the other end engaging the base for spring biasing the jaw to clamping position wherein the clamping portion of the jaw engages the base, and a trigger carried by the base for releasably engaging the trigger engaging portion of the jaw for releasably holding the clamping jaw out of clamping position.

2. A mouse trap comprising a base, a pair of spaced jaws supporting ears on the base, one of the ears having a hole and the other a slot, a jaw formed from a single piece of wire and including a straight axle portion formed from one end of the wire and having a first free end and a second end, a substantially U-shaped trigger engaging portion extending radially from the straight axle portion and formed from the wire by bending the same from the second end of the straight axle portion and looping the same over the straight axle portion adjacent its first free end and a substantially U-shaped clamping portion extending radially from the straight axle portion and angularly displaced with respect to the trigger engaging portion and formed from the wire at the loop adjacent the first free end of the straight axle portion and looping the same over the straight axle portion adjacent its second end, the first free end of the straight axle portion of the jaw being received in the hole in one of the ears and the second end of the straight axle portion of the jaw being received in the slot of the other ear for pivotally mounting the jaw on the base, a coil spring carried by the straight axle portion of the jaw and having one end engaging the jaw and the other end engaging the base for spring biasing the jaw to clamping position wherein the clamping portion of the jaw engages the base, and a trigger carried by the base for releasably engaging the trigger engaging portion of the jaw for releasably holding the clamping jaw out of clamping position.

3. A mouse trap comprising a sheet metal base, a single piece jaw pivotally mounted on the base, a pair of spaced ears struck upwardly from the base, a sheet metal trigger for the jaw having spaced portions adjacent the spaced ears, a pivot pin extending through the spaced ears and the spaced portions of the trigger for pivotally mounting the trigger for rotation in a vertical plane and for limiting swinging and tilting of the trigger out of said vertical plane, a shoulder on each spaced portion of the trigger to be engaged by and for releasably retaining the single piece jaw, one of the shoulders being larger than the other for enhancing the sensitivity of the mouse trap.

4. A mouse trap comprising a sheet metal base, a pair of spaced jaw supporting ears struck upwardly from the base adjacent the center thereof, a guide ear struck upwardly from the base adjacent the center thereof, a pair of spaced trigger supporting ears struck upwardly from the base adjacent one end thereof, a jaw formed from a single piece of wire and having a straight axle portion pivotally mounted in the jaw supporting ears, a coil spring carried by the straight axle portion of the jaw and having one end engaging the jaw and the other the base for urging the jaw to clamping position wherein the jaw engages the base, a sheet metal trigger extending lengthwise of the mouse trap and having a hole therein adjacent the middle thereof for receiving the guiding ear and a pair of spaced portions adjacent the spaced trigger supporting ears, a pivot pin extending through the spaced supporting ears and the spaced portions of the trigger for pivotally mounting the trigger for rotation in a vertical plane and cooperating with the guiding ear for limiting swinging and tilting of the trigger out of said vertical plane, a spring about the guiding ear between the trigger and the base for biasing the trigger to jaw engaging position, and a shoulder on at least one of the spaced portions of the trigger for engaging and retaining the jaw out of clamping position against the action of the jaw operating coil spring.

5. A mouse trap comprising a sheet metal base having an opening adjacent one end thereof, a pair of spaced jaw supporting ears struck upwardly from the base adjacent the center thereof and having openings therein, a guide ear struck upwardly from the base adjacent the center thereof and a pair of spaced trigger supporting ears struck upwardly from the base adjacent the other end thereof, a jaw formed from a single piece of wire and including a straight axle portion formed from one end of the wire and having a first free end and a second end, a substantially U-shaped trigger engaging portion extending radially from the straight axle portion and formed from the wire by bending the same from the second end of the straight axle portion and looping the same over the straight axle portion adjacent its first free end and a substantially U-shaped clamping portion extending radially from the straight axle portion and angularly displaced with respect to the trigger engaging portion and formed from the wire at the loop adjacent the first free end of the straight axle portion and looping the same over the straight axle portion adjacent its second end, the ends of the straight axle portion of the jaw being received in the openings in the spaced jaw supporting ears for pivotally mounting the jaw on the base, a coil spring carried by the straight axle portion of the jaw and having one end engaging the jaw and the other end engaging the base for spring biasing the jaw to clamping position wherein the clamping portion of the jaw engages the base adjacent the opening therein, a sheet metal trigger extending longitudinally of the base and having an enlarged bait supporting portion overlying the opening in the base, a hole therein adjacent the middle thereof for receiving the guiding ear and a pair of spaced portions adjacent the spaced trigger supporting ears, a pivot pin extending through the spaced supporting ears and the spaced portions of the trigger for pivotally mounting the trigger for rotation in a vertical plane and cooperating with the guiding ear for limiting swinging and tilting of the trigger out of said vertical plane, a spring about the guiding ear between the trigger and the base for biasing the trigger to jaw engaging position, and a shoulder on each spaced portion of the trigger to be engaged by the trigger engaging portion of the jaw for releasably retaining the jaw out of clamping position against the action of the jaw operating coil spring, one of the shoulders being larger than the other for enhancing the sensitivity of the mouse trap.

VIRGIL F. JOHNSON.

REFERENCES CITED

The following references are of record in the file of this patent:

UNITED STATES PATENTS

| Number | Name | Date |
|---|---|---|
| 580,861 | Hall | Apr. 20, 1897 |
| 1,083,125 | Nebel | Dec. 30, 1913 |
| 1,149,584 | Innes | Aug. 10, 1915 |
| 1,410,737 | Dickey | Mar. 28, 1922 |
| 1,462,739 | Champlin | July 24, 1923 |
| 1,830,261 | Bunker | Nov. 3, 1931 |
| 1,975,048 | Ludeke | Sept. 25, 1934 |
| 2,169,945 | Eslick | Aug. 15, 1939 |
| 2,240,754 | Briddell | May 6, 1941 |
| 2,263,560 | Barrows | Nov. 25, 1941 |
| 2,428,721 | Peterson | Oct. 7, 1947 |

FOREIGN PATENTS

| Number | Country | Date |
|---|---|---|
| 41,561 | Sweden | Nov. 8, 1916 |